United States Patent

[11] 3,540,745

| [72] | Inventor | Henry H. Flock<br>Park Ridge, Illinois |
|---|---|---|
| [21] | Appl. No. | 691,435 |
| [22] | Filed | Dec. 18, 1967 |
| [45] | Patented | Nov. 17, 1970 |
| [73] | Assignee | Parker-Hannifin Corporation<br>Cleveland, Ohio<br>a corporation of Ohio |

[54] PISTON SEAL
5 Claims, 3 Drawing Figs.

[52] U.S. Cl. .................................................. 277/188,
277/205, 277/63
[51] Int. Cl. ...................................................... F16j 15/16
[50] Field of Search ............................................. 92/248;
277/58, 59, 63, 188, 205

[56] References Cited
UNITED STATES PATENTS

| 2,797,971 | 2/1957 | Greenough | 277/188X |
| 2,844,421 | 7/1958 | Hayman | 277/188 |
| 2,997,318 | 8/1961 | Lansky et al. | 277/205X |
| 3,188,099 | 6/1965 | Johnson et al. | 277/188 |
| 3,334,549 | 8/1967 | Sheldon | 277/63X |
| 3,362,720 | 1/1968 | Henry et al. | 277/188X |

FOREIGN PATENTS

| 1,331,149 | 5/1963 | France | 277/188 |
| 585,336 | 11/1958 | Italy | 277/188 |

Primary Examiner—Laverne D. Geiger
Assistant Examiner—Jeffrey S. Mednick
Attorney—John N. Wolfram ABSTRACT: A piston seal in which the piston has a flange and sealing surface, the sealing surface having thereon a soft packing, a first nonmetallic backup ring and a second nonmetallic backup ring, the first backup ring being circumferentially continuous and of harder material than the packing and having little or no initial clearance at its I.D. and O.D. and being deformable radially inwardly and outwardly to take up any clearance that may exist at its I.D. and O.D., the second backup ring being between the first backup ring and the flange and of relatively rigid material, the second backup ring being circumferentially split and having little or no initial clearance at its O.D. and from zero to moderate clearance at its I.D., and the flange having a substantial clearance with the cylinder bore. The arrangement may also include a nonmetallic bearing sleeve on the piston having less clearance with the cylinder bore than does the piston flange.

Patented Nov. 17, 1970

3,540,745

INVENTOR
HENRY H. FLOCK
ATTORNEY

PISTON SEAL

In many fluid pressure operated cylinders it is desirable to use steel for the cylinder tube and the piston because of its relatively low cost and easy machinability. In such cases the steel piston must be kept out of contact with the steel cylinder tube in order to avoid scoring or galling of the latter. Also, even if the piston and tube are made of dissimilar metals the clearance between the two must be larger than the cross section size of any particles of steel or other hard foreign material that may find its way into the cylinder, as otherwise the particles would be jammed therebetween and caused detrimental scoring of the cylinder wall. However, there is a limit to the radial clearance that can be permitted between the piston and cylinder tube because of the danger of extruding the piston packing into the clearance.

This problem has been met to some extent in the past by the use of nonmetallic backup rings of harder material than the packing located between the packing and a flange on the piston. However, until now the sealing arrangements utilizing such backup rings permit maximum radial clearances of only about .015 inches between the metal piston and the cylinder wall for fluid pressures of 3,000 p.s.i., which is insufficient for economical construction and for assurance that wear of nonmetallic bearing members will not result in contact between the metal piston and cylinder.

The present invention solves this problem by providing a relatively large clearance between the largest diameter of the piston and the cylinder bore and by providing a pair of backup rings for the soft packing. The first backup ring is of deformable nonmetallic material harder than the packing and initially having little or no clearance at its I.D. and O.D. and radially deformable inwardly and outwardly to take up any clearances that may exist at these locations, and the second backup ring being of nonmetallic material harder than the first backup ring and with little or no clearance at its O.D. and with from zero to moderate clearance at its I.D. The second backup ring is expandable radially outwardly to take up any clearance that might exist at its O.D. The first backup ring is sufficiently rigid to resist extrusion into the moderate clearance that may exist at the I.D. of the second backup ring and the latter is sufficiently rigid to resist extrusion into the substantially large clearance existing at the O.D. of the piston flange. The piston may have a sealing arrangement as just described at each end and there may be a plastic bearing ring in the central part of the piston for making bearing contact with the cylinder bore wall.

Figure 1:
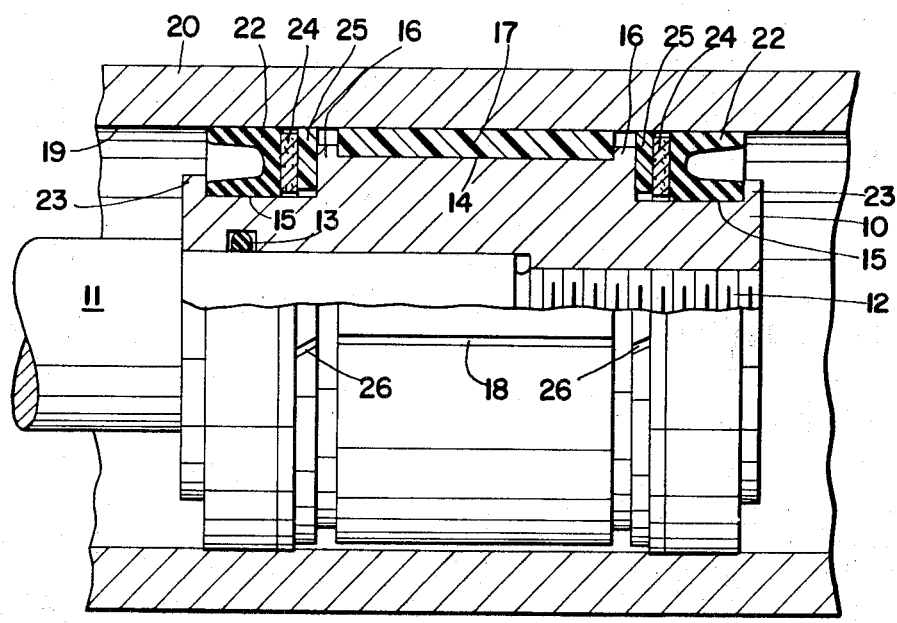
FIG. 1 is a cross section of cylinder and piston, the piston being partially cut away to show the packings, backup rings and bearing ring cross section.
Figure 2:
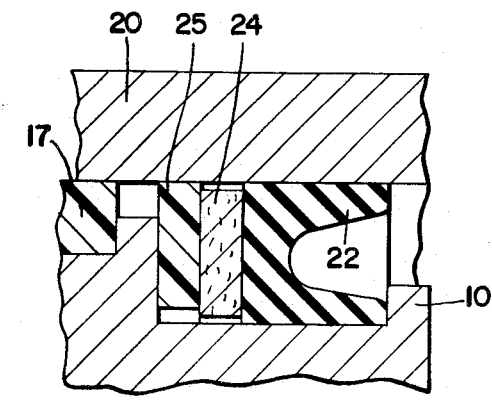
FIG. 2 is a fragmentary enlarged view of the packing arrangement when no fluid pressure is present.
Figure 3:
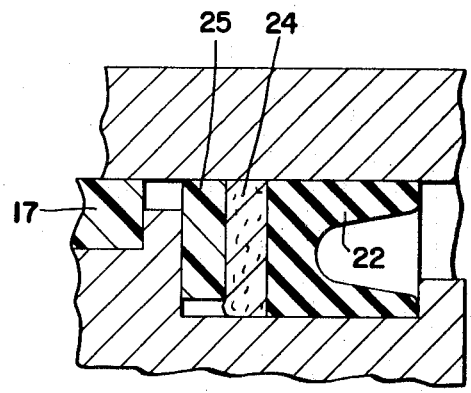
FIG. 3 is a fragmentary enlarged view when fluid pressure is present.

Piston 10 of steel or other metal is attached to the piston rod 11 by the threaded connection 12 and is sealed relative thereto by packing 13. It has a central annular recess 14 that is separated from piston cylindrical sealing surfaces 15 by piston flanges 16.

Mounted in recess 14 is a nonmetallic bearing ring 17, preferably of phenolic resin and having one or more axial splits 18 to facilitate insertion into recess 14. Ring 17 may have a radial clearance at either or both its I.D. and O.D. but the sum of such clearances preferably is not more than .005 inches. This ring acts as a bearing for piston 10 by contacting the cylinder wall under side loading of the piston and is of sufficient length to prevent cocking of the piston within the cylinder bore.

Mounted on each piston surface 15 is a relatively soft elastomeric packing ring 22 that may be in the form of a U-cup or other conventional shape. It is retained on the piston by a circular lip 23 and is in initial sealing contact with bore wall 19 and piston sealing surface 15.

Next to packing ring 22 is a circumferentially continuous first backup ring 24 of leather, an elastomer, polytetrafluoroethylene or other nonmetallic material harder than packing ring 22 and which is deformable radially inwardly and outwardly when compressed endwise by action of fluid pressure upon packing 22. Ring 24 has initial radial clearances with bore 19 and surface 15 that are preferably zero but which may be up to about .005 inches so as to be sufficiently small so that packing 22 will not be extruded thereinto by pressure of fluid.

Next to ring 24 is a second backup ring 25 having a circumferential split 26. It is of relatively nondeformable nonmetallic material, such as phenolic, that is harder than first backup ring 24. Being split, it may have an outward bias so as to be in initial contact with bore wall 19 and with its I.D. radially spaced from surface 15 about .005 inches to .015 inches. This latter clearance is the same or larger than the sum of the radial I.D. and O.D. clearances of bearing ring 17 so that in case the piston moves radially the load between the piston and cylinder bore wall is taken up by ring 17.

With the materials and clearances indicated, and with packing ring 22 of 70 durometer rubber and the phenolic resin having a hardness of about 85 scleroscope, the cylinder may be operated at 3,000 p.s.i. with no danger of extrusion of the packing and backup rings into adjacent clearances. When the fluid pressure is admitted to one side or the other of piston 10 it acts on the respective packing 13 and forces the same against its first backup ring 24. Such first backup ring, if not already in contact with surfaces 19 and 15, will be deformed radially inwardly and outwardly to take up any initial clearance at these locations to prevent extrusion of packing ring 22 thereinto.

Backup ring 25, if not already in contact with wall 19, will expand thereagainst by action of either or both gradient fluid pressure or from contact with the first backup ring and the clearance at its I.D. may become as much as .015 inches. However, this clearance is sufficiently small so that first backup ring 24 will not extrude thereinto. At the same time, backup ring 25 is sufficiently hard so that it will not extrude into the relatively large radial clearance, which may be as much as .050 inches, between flange 16 and bore wall 19.

Thus neither the packings nor the backup rings extrude into a clearance so as to cause either damage thereto or jamming of the piston and yet there is ample clearance between flanges 16 of the steel piston and cylinder bore wall 19 to avoid all possibility of scoring contact with the latter or the trapping of loose metal particles therebetween.

Although the packing arrangement disclosed herein has been described as applied to a piston and cylinder, it may likewise be applied to other telescoping relatively reciprocal cylindrical parts, as for example, a piston rod and gland.

I claim:

1. An assembly comprising a member having a cylindrical bore, a movable member within the bore and having a cylindrical sealing surface and a flange, a relatively soft packing ring on the sealing surface and in sealing contact therewith and with the cylindrical bore, a first circumferentially continuous nonmetallic deformable backup ring of material harder than the packing ring next to the packing ring, a second nonmetallic backup ring of material harder than said first backup ring between the first backup ring and the flange and having an initial clearance with said sealing surface, said first backup ring being expandable radially inwardly and outwardly into tight contact with said sealing surface and bore wall when subjected to endwise compression by said packing ring, said second backup ring being expandable radially outwardly into tight contact with the bore wall by deformation of said first backup ring into said clearance when said fluid pressure is applied to the packing ring, said flange having a larger radial clearance with said bore wall than does the expanded second backup ring with the sealing surface.

2. The assembly of claim 1 in which said first backup ring has an (no more than .005 inches) initial radial clearance with said sealing surface and said bore wall.

3. The assembly of claim 1 in which the movable member has an additional flange spaced from the first flange, a groove between said flanges, and a nonmetallic bearing ring within said groove, the total radial clearance space between the bearing ring and the groove bottom and the bore wall being less than the radial clearance between either flange and the bore wall, and said bearing ring being confined to said groove between said flanges and being axially spaced from said second backup ring.

4. The assembly of claim 3 in which the bearing ring is of phenolic material and is circumferentially split.

5. The assembly of claim 1 in which said first backup ring is deformable into only a portion of said clearance.